(12) United States Patent
Djugash

(10) Patent No.: US 9,223,837 B2
(45) Date of Patent: Dec. 29, 2015

(54) COMPUTER-BASED METHOD AND SYSTEM FOR PROVIDING ACTIVE AND AUTOMATIC PERSONAL ASSISTANCE USING AN AUTOMOBILE OR A PORTABLE ELECTRONIC DEVICE

(71) Applicant: Toyota Motor Engineering & Manufacturing North America, Inc., Erlanger, KY (US)

(72) Inventor: Joseph M. A. Djugash, San Jose, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 295 days.

(21) Appl. No.: 13/830,888

(22) Filed: Mar. 14, 2013

(65) Prior Publication Data

US 2014/0280051 A1    Sep. 18, 2014

(51) Int. Cl.
| | |
|---|---|
| *B60W 50/06* | (2006.01) |
| *B60W 50/08* | (2012.01) |
| *B60W 50/10* | (2012.01) |
| *B60W 50/12* | (2012.01) |
| *B60W 50/14* | (2012.01) |
| *G06Q 10/06* | (2012.01) |
| *G06F 17/30* | (2006.01) |

(Continued)

(52) U.S. Cl.
CPC ......... *G06F 17/30554* (2013.01); *B60W 30/00* (2013.01); *B60W 50/0098* (2013.01); *B60W 50/08* (2013.01); *G06Q 10/06* (2013.01); *B60W 2050/0078* (2013.01); *B60W 2050/0079* (2013.01); *B60W 2050/143* (2013.01)

(58) Field of Classification Search
USPC ................................ 706/12, 20, 21; 382/118
See application file for complete search history.

(56) References Cited

U.S. PATENT DOCUMENTS

| | | |
|---|---|---|
| 5,913,212 A | 6/1999 | Sutcliffe et al. |
| 6,549,939 B1 | 4/2003 | Ford et al. |

(Continued)

FOREIGN PATENT DOCUMENTS

| | | |
|---|---|---|
| EP | 1314102 | 6/2009 |
| EP | 2284574 | 2/2011 |
| WO | WO 2010/134824 | 11/2010 |

OTHER PUBLICATIONS

Singh et al. (Singh12), "Your Smartphone Can Watch the Road and You: Mobile Assistant for Inattentive Drivers", ACM 978-1 4503-1281-3/12/06.*

(Continued)

*Primary Examiner* — Jeffrey A Gaffin
*Assistant Examiner* — Nathan Brown, Jr.
(74) *Attorney, Agent, or Firm* — Snell & Wilmer LLP

(57) ABSTRACT

A method and a system for providing personal assistance in daily activities. A method and a system for automatically and actively providing personal assistance, using a vehicle or a portable electronic device, based on detected data regarding a user and the user's environment. The method and system may include a processor, at least one sensor, an output device, a communications unit, and a database. The database may further include a memory and cloud-based database and computing. The method and system may actively and automatically provide personal assistance regarding health, exercise, diet, or nutrition. The method and system may assist the user or a health professional in health diagnosis and treatment.

29 Claims, 12 Drawing Sheets

(51) Int. Cl.
  *B60W 50/00*  (2006.01)
  *B60W 30/00*  (2006.01)

(56) References Cited

U.S. PATENT DOCUMENTS

| | | | |
|---|---|---|---|
| 6,792,427 | B2 | 9/2004 | Jackson |
| 7,543,233 | B2 | 6/2009 | Reponen et al. |
| 2005/0234310 | A1 | 10/2005 | Alwan et al. |
| 2006/0148528 | A1 | 7/2006 | Jung et al. |
| 2011/0099142 | A1 | 4/2011 | Karjalainen et al. |
| 2012/0245817 | A1 | 9/2012 | Cooprider et al. |

OTHER PUBLICATIONS

Perez; "Intelligent, Context-Aware Personal Assistant App "Friday" Makes Its Public Debut"; Jul. 20, 2012.
DeVaul; "The Memory Glasses Project"; Oct. 28, 2013.
Armstrong et al.; "Using Smartphones to Address the Needs of Persons with Alzheimer's Disease"; Ann. Telecommun.; 65:485-495; 2010.
Coronato; "Smart Enviornments for Alzheimer's Patients"; Awareness Magazine; 2 pages; 2012.
Hammerl et al.; "Towards a Semi-Automatic Personal Digital Diary"; PETRA 2012; 8 pages; 2012.
Inglis et al.; "Issues Surrounding the User-Centered Development of a new Interactive Memory Aid"; Univ Access Inf Soc; 2:226-234; 2003.
Kores; "How Emotional Should the iCat Robot be?"; 76 pages; 2008.
Lee et al.; "Capturing and Reviewing Context in Memory Aids"; CHI 2006, Apr. 22-27, 2006; 4 pages.
Sanchez-Pi et al.; "A Smart Solution for Elders in Ambient Assisted Living"; IWINAC 2009; pp. 95-103; 2009.
www.yankodesign.com/2009/05/14/dear-diary-i-love-my-robot; May 14, 2009.
Busari; "Life-Logging Camera Brings New Hope for Memory-Loss Patients"; 3 pages; Nov. 5, 2009.
Pirttikangas et al.; "Know Your Whereabouts"; 7 pages; Nov. 15, 2012.
Singh, et al.; "Your Smartphone Can Watch the Road and You: Mobile Assistant for Inattentive Drivers"; *MobiHoc '12*; 2 pages; Jun. 11-14, 2012.
Campbell, et al.; "From Smart to Cognitive Phones"; 2012 IEEE; pp. 7-11; Jul. 2012.

\* cited by examiner

COMPUTER-BASED METHOD AND SYSTEM FOR PROVIDING ACTIVE AND AUTOMATIC PERSONAL ASSISTANCE USING AN AUTOMOBILE OR A PORTABLE ELECTRONIC DEVICE

BACKGROUND

1. Field

The present invention relates generally to a computer-based method of providing personal assistance in daily activities and more particularly, pertains to a method and a system of automatically and actively providing personal assistance, using a vehicle or a portable electronic device, based on detected data regarding the user and the user's environment.

2. Description of the Related Art

Computing power is ever advancing. Records of data may be made with more ease than was previously obtainable. Prior personal assistance and memory jogging methods/systems implemented in a vehicle or a portable electronic device have heavily relied upon passively outputting data based on an input/request from the user or upon occurrence of a predetermined or scheduled event stored in a database. However, currently, a computer-based method or system is needed for actively and automatically providing personal assistance to the user (e.g., actively and automatically reminding the user of an event or actively and automatically encouraging the user to take a particular action based on conversational and situational cues). Thus, a method/system is needed for detecting and analyzing data regarding the user and the environment surrounding the user, and actively and automatically providing personal assistance based on the detected and analyzed data.

SUMMARY

The present invention relates generally to a computer-based method of providing personal assistance in daily activities and more particularly, pertains to a method and a system of automatically and actively providing personal assistance, using a vehicle or a portable electronic device, based on detected data regarding the user and the user's environment.

In one embodiment, the present invention may be, for example, a computer-based method including the steps of: detecting, using at least one sensor, a data associated with at least one person, an object, a living being, a place, an environment, or combinations thereof within a proximity of at least one of the at least one sensor; selectively storing, using a processor, a learned data in a database based on the detected data and a pre-programmed algorithm stored in the database; passively outputting, using a communications unit or an output device coupled to or in communication with the processor, a first output data upon a request received by the processor or a predetermined or scheduled event stored in the database; and actively and automatically outputting, using the communications unit or the output device, a second output data based on the detected data, the learned data, and the pre-programmed algorithm.

In another embodiment, the method may include analyzing, using the processor, the detected data based on the learned data corresponding to the at least one person, the object, the living being, the event, the place, the environment, or combinations thereof such that the steps of selectively storing the database and actively and automatically outputting the second output data are further based on the analyzed data. In yet another embodiment, the method may include analyzing, using the processor, a conversation or an interaction based on the detected data, such that the step of actively and automatically outputting the second output data further includes at least one of: actively and automatically generating, using the communications unit or the output device, a sound, an image, a video, or combinations thereof for actively and automatically initiating or participating in the conversation or the interaction with the at least one person; or actively and automatically generating, using the communications unit or the output device, the sound, the image, the video, or combinations thereof for actively communicating a reminder to the user.

In yet another embodiment, the present invention may be a vehicle including: at least one sensor configured to detect a data associated with a driver, a passenger, an object, a living being, an event, a place, an environment, or combinations thereof within a proximity of at least one of the at least one sensor; a database storing a pre-programmed algorithm; a communications unit; and a processor coupled to or in communication with the at least one sensor, the database, and the communications unit, the processor being configured to: selectively store a learned data in the database based on the detected data and the pre-programmed algorithm; analyze the detected data based on the learned data and the pre-programmed algorithm; passively outputting, using the communications unit, a first output data upon a request received by the processor or a predetermined or scheduled event stored in the database; and actively and automatically output, using the communications unit, a second output data based on the analyzed data, the learned data, and the pre-programmed algorithm.

In yet another embodiment, the present invention may be a portable electronic device including: at least one sensor configured to detect a data associated with at least one person or a user, an object, a living being, an event, a place, an environment, or combinations thereof within a proximity of at least one of the at least one sensor; a database storing a pre-programmed algorithm; a communications unit; and a processor coupled to or in communication with the at least one sensor, the database, and the communications unit, the processor being configured to: selectively store a learned data in the database based on the detected data and the pre-programmed algorithm; analyze the detected data based on the learned data and the pre-programmed algorithm; passively output, using the communications unit, a first output data upon a request received by the processor or a predetermined or scheduled event stored in the database; and actively and automatically output, using the communications unit, a second output data based on the analyzed data, the learned data, and the pre-programmed algorithm.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Figure 1:
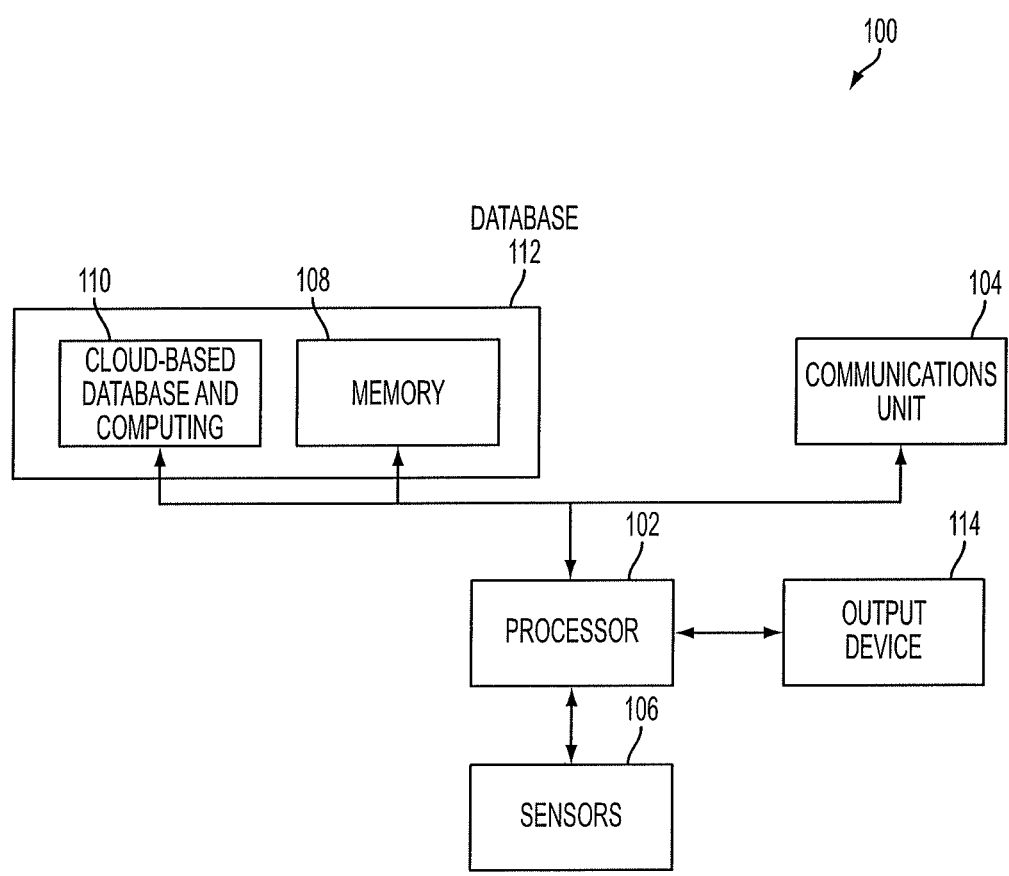
FIG. 1 is a block diagram of a computer-based method/system of automatically providing personal assistance according to an embodiment of the present invention.

Referring to FIG. 1, a block diagram is shown of a method/system 100 according to an embodiment of the present invention. The method/system 100 may include a processor 102, a communications unit 104, sensors 106, a database 112, and an output device 114. The database 112 may include a memory 108 and cloud-based database and computing 110. In other embodiments, the database 112 may include solely the memory 108 or solely the cloud-based database and computing 110. The various units of the method/system 100 may be in communication with one another by using transmission of an electronic signal through a Control Area Network (CAN) bus. In other embodiments, the control and communications may be over various other types of serial communication links, direct wirings, digital communication buses, wireless communications, or other communication links and networks.

In general, in the method/system 100, the database 112 stores a pre-programmed algorithm. The method/system 100 continuously detects a data associated with a user or a person within a proximity of at least one of the sensors 106. The method/system 100 may further detect data associated with a static or dynamic object, a living being, a surrounding environment/place, and other detectable matters within the proximity of at least one of the sensors 106. The method/system 100 not only outputs a first output data (using the communications unit 104 and/or using the output device 114) upon a request received by the processor 102 or a predetermined event stored in the database, but also actively and automatically outputs a second output data (via the communications unit 104 and/or using the output device 114). As such, the method/system 100 is configured to actively and automatically provide personal assistance to the user by detecting data regarding the user and the surrounding environment of the user, analyzing, storing, and cataloging the data, and outputting a second output data which can, for example, include helpful information as needed and as appropriate under the circumstances as determined by appropriateness algorithm rules described below (including but not limited to privacy concern rules). The processor 102 may modify or supplement the appropriateness algorithm rules based on the learned data. Analyzing and variants thereof, as used herein, may refer to including, but not limited to, any analysis, parsing, cataloging, or any other type of processing performed using detected data that may assist in storing data for later use, analyzing data to draw an inference, retrieving data, or outputting data.

The method/system 100 is not limited to any particular device, unit, or platform. In another embodiment, the method/system 100 is integrated in a vehicle. A vehicle as used herein includes, but is not limited to, any type of transportation device such as an automobile, a wheelchair, a walker, a two-wheeled self-balancing vehicle, a scooter, a three-wheeled vehicle, or various other devices which may enable or assist a user in transportation.

Figure 2A:
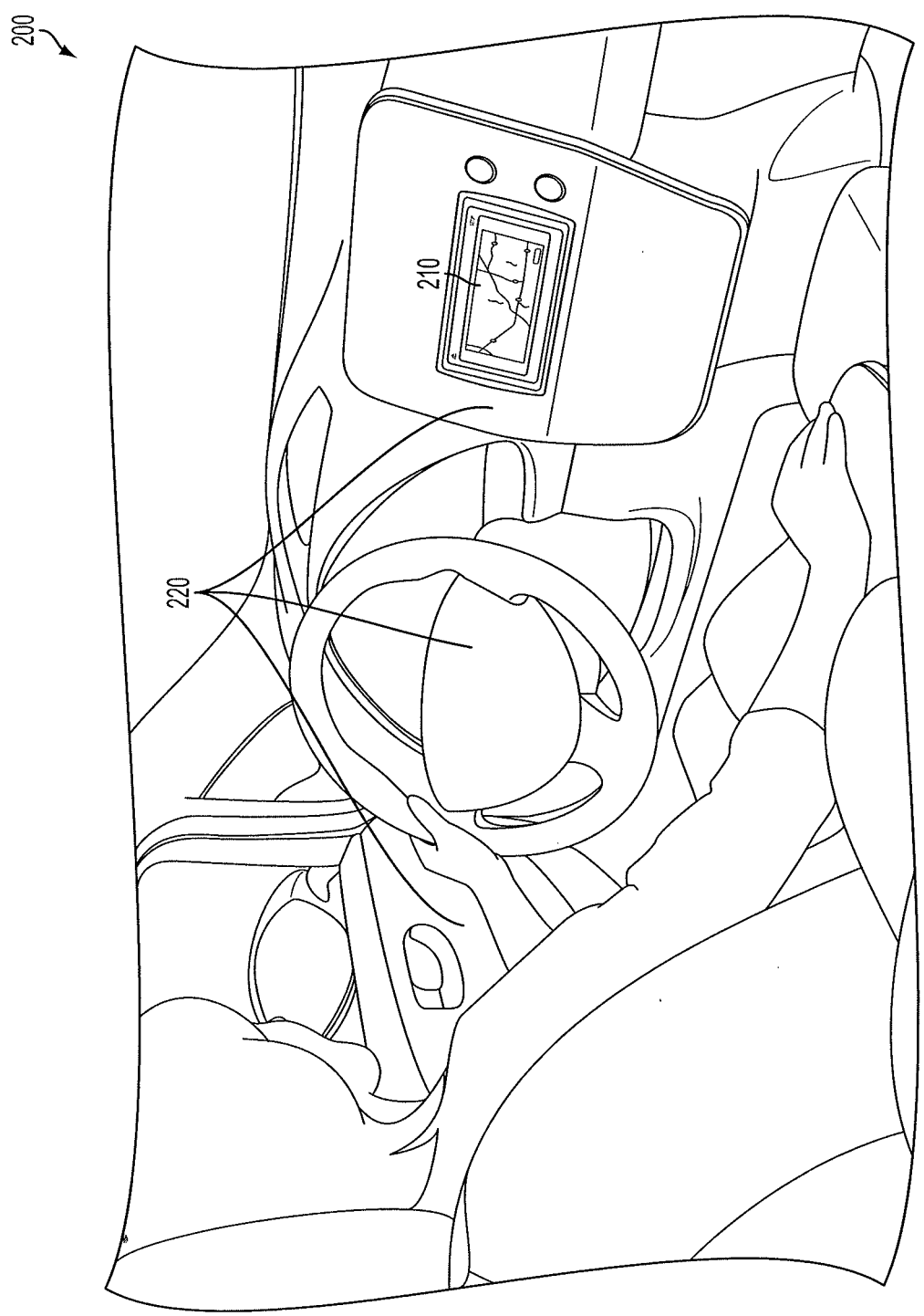
FIGS. 2A and 2B illustrate a computer-based method/system implemented in a vehicle for detecting and processing conversations and events, and actively and automatically providing guidance to the user according to an embodiment of the present invention.
Figure 2B:
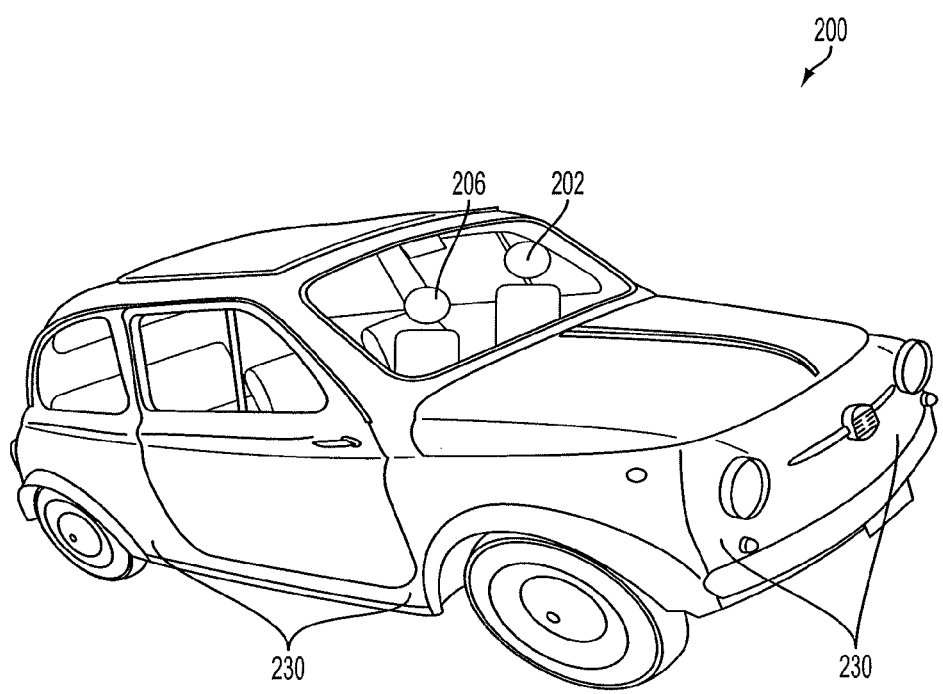

In an embodiment illustrated in FIGS. 2A and 2B, a computer-based method/system implemented in a vehicle for detecting and analyzing conversations and events, and actively and automatically providing assistance and guidance to the user, according to another embodiment of the present invention. The processor 102 may be an Electronic Control Unit (ECU) of the vehicle or any other processor capable of processing data. The memory 108 may be employed in the vehicle and coupled to or in communication with the processor 102. The memory 108 may be, for example, a random access memory (RAM) or a read only memory (ROM). The ECU or a separate processor may have access to the Internet or be in communication with the cloud-based database and computing 110. Various cloud-based solutions may be utilized without limiting the scope of the invention. The communications unit 104 or the output device 114 may be an input/output interface 210 illustrated in FIG. 2A. The sensors 106 may be located at sensor locations 220 in order to detect data.

Referring to FIG. 1, in yet another embodiment, the method/system 100 may be a software program or application ("app") implemented in a portable electronic device. A portable electronic device as used herein includes, but is not limited to, a laptop, a mobile communication device such as a cellular phone or a smart phone, a tablet, a handheld PC, a PDA, a smartbook, and other portable electrical or electromechanical devices capable of processing data.

Referring to FIG. 1, in one embodiment, method/system 100 may utilize the sensors 106 to detect data within a proximity of the user, thereby allowing the processor 102 to draw inferences regarding the surrounding environment of the user. The processor 102 may then analyze the detected data in order to extract information and draw inferences that may enable the method/system 100 to assist the user in real time or store the analyzed data for automatically providing personal assistance at a later time. Such detected data may be related to persons, objects, events, places or any other information that the sensors 106 may detect in order to enable the processor 102 to draw inferences regarding any matter in an environment within a proximity of at least one of the sensors 106.

The sensors 106 may include converters that measure a physical quantity and convert the measured physical quantity into a signal which can be analyzed or processed by the processor 102. The sensors 106 may be any type of sensor and/or a plurality of sensors operating in concert together. The sensors 106 may be integrated in or coupled to the method/system 100. The sensors 106 may be positioned at a distance away from the method/system 100 such that the sensors 106 are in communication with the processor 102, e.g., via a network. The processor 102 may be coupled to or in communication with external devices in order to supplement the data detected by the sensors 106. The sensors 106 may be integrated in or coupled to an input/output communications interface, the output device 114, or various other devices or platforms without limiting the scope of the invention. For example, the input/output communications interface may be integrated in or coupled to a vehicle or a portable electronic device.

Referring to FIGS. 2A and 2B, in the method/system 200 implemented in a vehicle, the sensors 106 may be positioned anywhere in the interior or the exterior of the vehicle without limiting the scope of the invention. For example, the sensors 106 may be positioned at sensor locations 220 shown in FIG. 2A and/or sensor locations 230 shown in FIG. 2B. The sensors 106 may alternatively or in addition, be implemented in an external device in communication with or coupled to the vehicle.

Similarly, in an embodiment in which the method/system 100 is implemented in a portable electronic device, the sensors 106 may be integrated in the portable electronic device. The sensors 106 may alternatively or in addition, be implemented in an external device in communication with or coupled to the portable electronic device.

The detected data, as used herein, includes, but is not limited to, any detected data that may assist the processor 102 in drawing an inference regarding a user or a person. The detected data includes, but is not limited to, a physical appearance, motion, interaction, action, behavior, conversation, characteristic, location, identity, or combinations thereof of at least one person or a user within a proximity of the user or at least one of the plurality of the sensors 106. The data, as used herein, may also include any data that may assist the processor 102 to draw an inference regarding any matter in an environment within a proximity of the user or at least one of the plurality of sensors 106. The data includes, but is not limited to, a characteristic, location, condition, type, or any attribute associated with an object, living being, surrounding place/environment, and other matters therein within a proximity of at least one of the sensors 106.

Proximity as used hereinafter refers to an area around the user or within the detection range of at least one of the sensors 106 within which data is sought to be collected. However, proximity, as used herein, is not limited to any particular distance range as the distance may vary depending on detection range of the sensors 106, the extent of area in which data is sought to be collected, and various other design or practical factors or limitations. In another embodiment, the detected data may not be limited to an environment within a proximity of the user. For example, in one embodiment, GPS data may be detected regarding a location that may be positioned well beyond the detection range of all of the sensors 106. The processor 102 may analyze the detected GPS data and automatically direct the communications unit 104 to output a second output data based on the detected GPS data.

In one embodiment, the sensors 106 may include sound and speech sensors such as a microphone capable of detecting speech, conversation, or sound. Speech as used herein may refer to speech, voice, or any other sound conveying information. In yet another embodiment, a 3-D (three-dimensional) microphone may be utilized to detect speech and further pinpoint or detect the location of the source of the detected speech.

For example, referring to FIG. 2A, a microphone may be positioned anywhere in the passenger compartment of the vehicle without limiting the scope of the invention. For example, the microphone may be positioned at any of the sensor locations 220. The microphone may be positioned, for example, on the steering wheel or an area adjacent to the steering wheel. The microphone or an additional microphone may be positioned, for example, in the driver or passenger overhead. The microphone may be utilized to detect a speech of the user 202 and/or the person 206. The detected speech may be analyzed as described in details below with respect to FIGS. 3-7 and 9.

The sensors 106 may further include an image sensor or a camera that may be integrated in, coupled to, or in communication with the method/system 100 for capturing images/videos. In an embodiment implemented in a portable electronic device, a camera embedded in the portable electronic device may be utilized to capture an image or a video. For example, if the method/system 100 is implemented in a smartphone, mobile applications may be operated to add capabilities to the camera or to process the image or video captured by the camera.

A camera embedded in a portable electronic device may have limited vantage points or a blocked view at times. In one embodiment, when the user is indoors, a camera may be utilized as an external device placed in a stationary position that has a better vantage point for capturing and sensing data. The camera may be in communication with the processor 102, thereby transmitting the detected data to the processor 102. For example, the camera may supplement the detected data regarding the at least one person or user by capturing a visual facial feature of the user/person.

Referring to FIGS. 2A and 2B, the camera may be positioned, for example, at the sensor locations 220. For example, the camera may capture an image or a video of the user 202 and/or the person 206. In addition or alternatively, a camera may be positioned on the exterior of the vehicle at sensor locations 230 for detecting data regarding an object, a living being, an event, a place, an environment (e.g., data regarding steep grade or vibration), or combinations thereof within a proximity of the vehicle. During the normal course of transit of the vehicle, data may be detected using the sensors 106 regarding the user 202 or the person 206 and stored in the database 112 for automatically providing personal assistance in real time or at a later time.

The sensors 106 may include positional encoders, compasses, navigational, and GPS sensors. The method/system 100 may be in communication with or coupled to a GPS system for supplementing the detected data. For example, if the method/system 100 is mounted on a mobile unit (e.g., a vehicle/transportation device), the sensors 106 may include an inertial measurement unit (IMU), which detects velocity, orientation, and gravitational forces of the mobile unit, using a combination of accelerometers, compasses, distance sensors, geomagnetic sensors, and gyroscopes. The sensors 106 may include various proximity/position sensors.

The sensors 106 may further include a capacitive displacement sensor, a passive thermal infrared sensor, a photocell (reflective) sensor, a radar sensor, a vibration sensor, a sonar sensor, and/or the like. The sensors 106 may also be configured to provide a user's current location and identify objects in the vicinity and/or within a geographic range. The sensors 106 may include perimeter monitoring sensors or ultraviolet, radio frequency, or infrared sensors. A three dimensional (3-D) scanner may be employed to analyze a real-world object or environment to collect data on its shape and its appearance (e.g., color). The detected data is then communicated to the processor 102 for constructing digital 3-D models.

The sensors 106 may further detect atmospheric pressure, smoke, and various other attributes of the environment within a proximity of the user. The sensors 106 may utilize thermistors to measure temperature. Based on the detected data, the processor 102 may determine the type of the environment (e.g., a shopping mall, a parking lot, an office, and other place/environment characteristics). For example, the processor 102 may further determine the current season or weather and the current temperature or moisture content based on the detected data. The sensors 106 may further include tactile sensors utilized to analyze contact with an object, person, living being, and other matters therein. In one embodiment, a touch sensor and/or a force sensor may be utilized to supplement the tactile information.

The sensors 106 may include sensors capable of detecting odor, magnetic fields, or radiation. Various other sensors may be integrated in, coupled to, or in communication with the sensors 106 in order to improve the quality or increase the quantity of the detected data without limiting the scope of the present invention.

Prior to a further detailed description of various embodiments of the method/system 100, an example of an application of the method/system 100 is provided.

Figure 3:
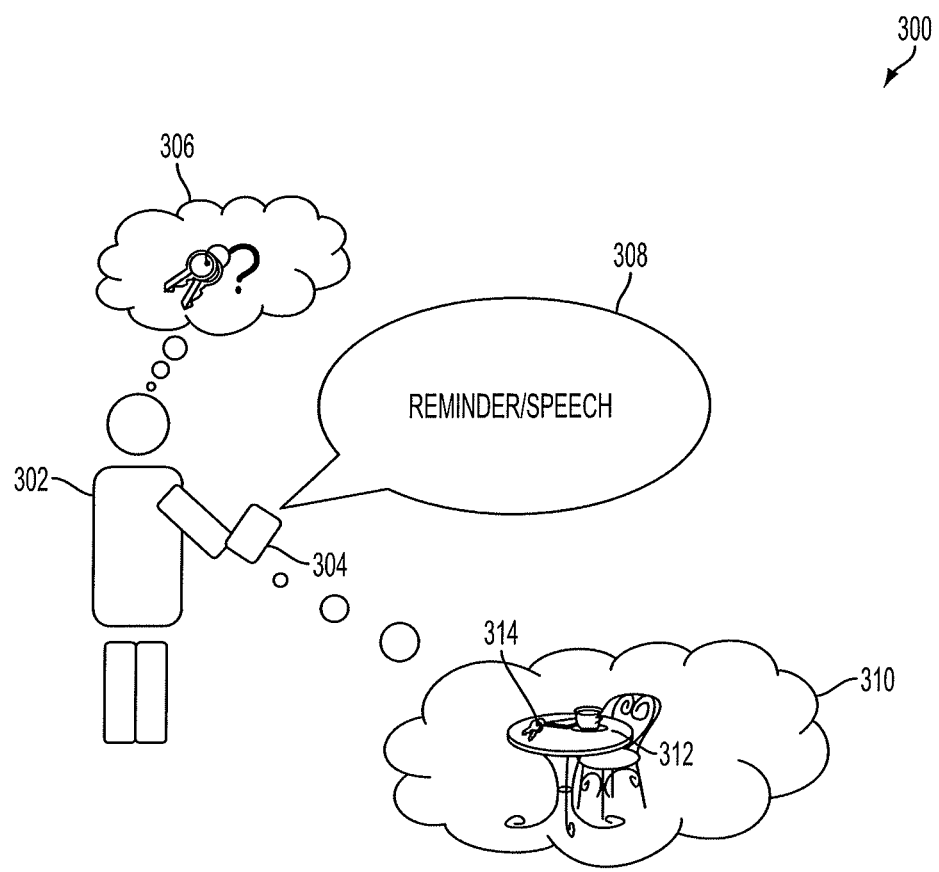
FIG. 3 illustrates a portable electronic device actively and automatically outputting data for providing personal assistance to a user according to an embodiment of the present invention.

Referring to FIG. 3, the method/system 300 serves as a personal assistant in daily activities. When the method/system 300 recognizes that the user 302 is searching for an object, i.e. a key 314, the portable electronic device 304 directs the user 302 to the key 314 by looking up prior relevant learned data and inferring context and interaction points. In an embodiment, the method/system 300 recognizes that the user 302 is searching for the key 314 and draws an inference 310 that the key 314 was placed on the table 312, by looking up prior relevant learned data. The method/system 300 directs the output device 114 (e.g., a speaker) to output a second output data corresponding to relevant helpful information regarding the location of the key 314. The output device 114 may be integral to, coupled to, or in communication with the method/system 300.

Outputting relevant helpful information includes outputting a first output data upon an input/request from the user or upon occurrence of a predetermined/scheduled event, and actively and automatically outputting a second output data based on the detected data and further based on a learned data. The learned data as used herein refers to currently or previously detected, processed, and stored data. The processor 102 may direct the portable electronic device 304 to passively output a first output data when the processor 102 receives, using the sensors 106, or determines via the detected data a request by the user 302 inquiring about the location of the key 314. The input/request may be received via: recognition of a facial expression detected by a camera and analyzed by the processor 102; input/request received from the user 302 using a communication interface of the portable electronic device 304; an input/request from external devices coupled to or in communication with the portable electronic device 304; other devices and methods of detecting an input/request; or combinations thereof.

However, an important aspect of the invention is that the method/system 300 is further configured to automatically output a second output data even without an input/request received from the user 302 and without occurrence of a predetermined or scheduled event. Recognition of the fact that the user 302 is searching for the key 314 can be performed using a combination of the sensors 106 described above. The method/system 300 is not limited to a particular sensor of the sensors 106 or any particular means of detecting such data.

In one embodiment, for example, if the user 302 utters a speech/thought 306, the sensors 106 detect the speech/thought 306. The processor 102 of the portable electronic device 304 can analyze the speech/thought 306 by parsing the elements of the speech/thought 306 to determine that the user 302 is attempting to search for the key 314. Additionally or alternatively, a camera may be integrated in or coupled to the portable electronic device 304. Alternatively or in addition, the portable electronic device 304 may detect a facial expression of the user 302 indicating a sense of confusion as to the current location of the key 314. Other sensed data such as tactile data may be detected as well. By looking up prior relevant learned data about the key 314, the method/system 300 matches speech elements with the object (key 314) and actions, place, time, and the like associated with the object (key 314). The processor 102 of the method/system 300 directs the portable electronic device 304 to output a second output data corresponding to relevant and appropriate information for assisting the user 302 in finding the key 314.

For example, the portable electronic device 304 may generate an output reminder/speech 308 indicating to the user 302 that the key 314 is placed on the table 312. The portable electronic device 304 may, alternatively or in addition, display an output video recorded (or recording) of the key 314 or the action of the user 302 placing the key 314 on the table 312. In one embodiment, the user 302 is only informed of the location of the object (e.g., the key 314).

For example, using the sensors 106, data is continuously or intermittently detected regarding a user 302 or a person during daily activities. The sensors 106 further continuously or intermittently detect data regarding static or dynamic objects, living beings, place/environment, or combinations thereof within a proximity of the sensors 106. During daily activities of the user 302, the method/system 300 may collect data associated with actions, interaction, speech, conversation, location, and other characteristics of the user 302 and the surrounding environment within a proximity of the user 302.

For example, the method/system 300 may have recognized, using the sensors 106 and the processor 102, that the key 314 was being placed on the table 312 based on a preprogrammed algorithm and previously detected, processed, and stored data as discussed in detail below. Given the detected data regarding a person, the user 302, objects (e.g., the key 314 or the table 312), places (e.g., the home environment around the user 302), the speech/thought 306, other detected or stored data, or combinations thereof, the processor 102 of the method/system 300 can infer context and key interaction points or events. For example, a key interaction point in the embodiment shown in FIG. 3, may have been the event of "<person> placing <object1> on <object2>." The <person>, <object1>, and <object2> may correspond to the user 302, the key 314, and the table 312, respectively. The event of "<person> placing <object1> on <object2>" may be inferred from a sequence of detected events as follows: "<person> holding and/or touching <object1>," "<object1> touching and positioned above <object2>", "<person> at a distance from or not touching <object1>." Similarly, picking up an object may be recognized. For example, the event "<person> picking up <object1>" can be composed of a sequence such as "<object1> next to <person>," "<person> touches <object1>," and "<person> holding <object1>." As such, the method/system 300 may utilize algorithms of the like to automatically detect and analyze relatively high level events by recognizing a sequence of relatively lower level events. The algorithms may be adjusted or developed as the method/system 300 collects more data regarding the user 302 and the matters within the surrounding environment of the user 302.

The recognition of placement of the key 314 on the table 312 may have been via analyzing a conversation or speech indicating placement of the key 314 on the table 312. The recognition may alternatively or in addition be based on capturing image/video of the placement of the key 314. Upon using such a process for recognizing the various events within the surrounding environment of the user 302, the method/system 300 can create a journal summary of daily life of the user 302.

The method/system 300 may be applied in various applications and with respect to various objects and events to provide personal assistance to the user 302. For example, in an alternative embodiment, the method/system 300 may determine based on the combinations of data included in the detected data whether the user 302 is thirsty or forgetful of where a bottle of water has been placed. The processor 102 of the portable electronic device 304 can direct the communications unit 104 to output a second output data containing information as to the location of the water bottle.

Figure 4:
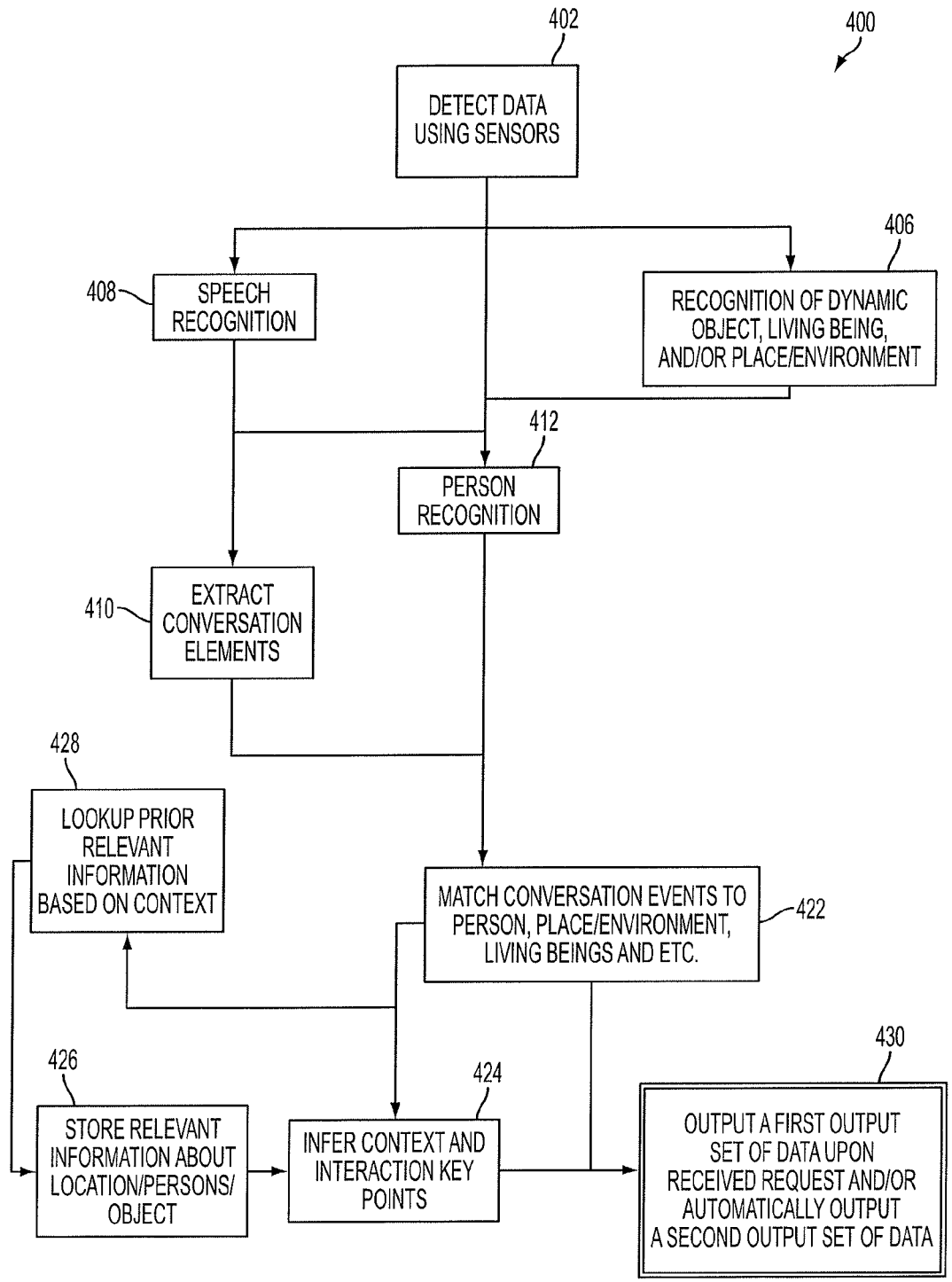
FIG. 4 illustrates a decision flowchart diagram showing a computer-based method/system of outputting a first and a second output data based on detected data according to an embodiment of the present invention.

Referring to a flowchart of a method/system 400 shown in FIG. 4, in step 404, data is detected, using the sensors 106 as described above with respect to FIGS. 1-3. The method/system 400 is only an example of the detection and analysis of the data. The steps of the method/system 400 may be performed simultaneously or in various combinations of orders. The degree to which the data can be collected regarding the surrounding environment of the user and matters therein may depend on what or which sensors 106 are available and the processing limitations of the processor 102 and/or the cloud-based database and computing 110. As such, the method/system 400 may be adjusted accordingly in real time by monitoring such limitations.

The processor 102 may work in concert with the sensors 106 for improving collection of the data. The processor 102 may also consider whether the user or a person is requesting or attempting to convey information. For example, if a user is making a facial expression without speech to communicate with the method/system 400, the processor 102 can direct the communications unit 104 to pose follow-up questions or inquiries using the communications unit 104 in order to supplement or clarify the detected data. For example, the method/system 400 may direct an output speech to be generated, thereby asking the user to clarify the facial expression. The user may then respond in a voice command clarifying the conveyed information.

In step 406, data regarding dynamic objects, living beings, and/or place/environment is detected and inferences are drawn accordingly. In one embodiment, if a camera is utilized in the method/system 400 and the camera has vantage points to detect images/videos containing useful information regarding the surrounding environment of the user, the method/system 400 may utilize the camera in addition to or as an alternative to a microphone to detect the data regarding the surrounding environment of the user and matters therein. For example, in step 406, the method/system 400 may detect movement or changes in a scene or other dynamic regions as observed by cameras in order to focus the sensors 106 on the detected dynamic regions. The processor 102 classifies the detected dynamic region as described below.

For example, detection of a person, living being, and/or a dynamic object may be performed by looking for changes in data detected by the sensors 106. For example, changes in data received from the camera may be determined. Changes in data detected by the sensors 106 may be identified by first estimating the motion of the method/system 400 or a mobile platform upon which the method/system 400 is implemented, using GPS, IMU, or techniques such as visual odometry which allow estimation of the motion of a camera by tracking corner or blob features between two camera frames. As such, the method/system 400 may identify motion in the surrounding environment of the user which does not correspond to the motion of the method/system 400.

Upon identifying the changing parts of the scene within the detected data, the method/system 400 seeks to recognize the changing elements, using techniques such as "eigenfaces" and "skeletal recognition" to recognize persons and faces. Additionally, standard techniques like Support Vector Machines, Deformable Parts Model and dynamic programming can be used to learn different models for various object/person classes. The types of features that can be used in these recognition tasks can be any combination of features like SIFT (Scale-Invariant Feature Transform), SURF (Speeded Up Robust Features), Gist modeling, Sobel, Fast, and other features and/or techniques that enable the method/system 400 to recognize a person, object, living being, or place/environment within a proximity of the user.

Thus, by detecting the dynamic regions, a dynamic object or being can be detected in step 406, and a new person entering the environment within the proximity of the user may be detected in step 412 and classified by the processor 102 in the database 112 accordingly. In step 406, the method/system 400 may extract the remaining static regions of the detected image/video in order to gather data regarding static objects or a place/environment within a proximity of the user.

The sensors 106 may utilize a microphone and a speech recognition module to detect speech, conversation or interaction as shown in step 408. The method/system 400 may further extract conversation elements containing useful data in step 410. In step 422, the processor 102 of the method/system 400 matches extracted conversation or speech elements from step 410 to the detected person, object, living being, place/environment, or combinations thereof.

In step 428, the method/system 400 looks up prior relevant information based on context and based on the matched conversation events from step 422 regarding the person, object, living being, place/environment, or combinations thereof. In step 426, the processor 102 stores relevant information for later use in the database 112 based on prior relevant information. For example, if the processor 102 detects facial features of a person entering the environment and also detects that the new person is speaking, the speech elements can be matched with the new person. Speech data related to the person may be stored in the database 112 for later use. A 3-D microphone or a microphone array may also be utilized to localize the origin of the sound or voice. The method/system 400 can track and log data related to the person in order to supplement the detected data. The method/system 400 may actively and automatically output a second output data in step 430 based on the matched conversation events to the corresponding person, object, living being, place/environment, or combinations thereof of step 422 and based on the inferred context and interaction key points from step 424.

The processing of data (e.g., in steps 406-430) can be performed by continuously analyzing data gathered by the sensors 106 in real time. The cloud-based database and computing 110 may be utilized due to restraints on the information storage capacity of the memory 108 or energy capacity challenges associated with processing using solely the processor 102. However, in one embodiment, both on-board and off-board processing capabilities are utilized to prepare for events in which on-board processing may be preferable (e.g., a poor connection in cloud communications) to ensure a minimal level of capability. For example, if the method/system 400 is implemented in a portable electronic device that may not have sufficient capacity to perform the steps described herein, the cloud-based database and computing 110 can provide assistance in sharing the load of processing.

In step 430, the processor 102 may passively output, using the communications unit 104, a first output data upon an input/request received by the processor 102 or a predetermined or scheduled event stored in the database 112.

The processor 102 may further actively and automatically output, using the communications unit 104, a second output data based on the detected data, previously detected, stored, and processed data, the pre-programmed algorithm, or combinations thereof.

For example, the first or second output data may be displayed via a display screen or via generation of an output speech via a speaker. In an embodiment in which the method/system 400 is implemented in a portable electronic device, the input/output user interface, display, speakers, microphone, or combinations thereof may be utilized as the communications unit 104. Referring to FIG. 2A, in an embodiment in which the method/system 400 is implemented in a vehicle, the input/output interface 210, display, speakers, microphone, or combinations thereof of the vehicle may be utilized as the communications unit 104.

The display may be, for example, a (color) liquid crystal display on which the second output data is displayed. The output images/videos may be displayed using an LCD, an organic light emitting display, a plasma display, light-emitting diodes, or any other display mechanism for displaying the output images/videos. In another embodiment, due to practical concerns, a projector in lieu of a display screen may be utilized to project output images/videos on a wall, screen, or surfaces of the like based on the first and/or second output data. A projector may be preferable if the method/system 400 is designed for a device with characteristics requiring a compact design.

The processor 102 may further submit the first and/or second output data to an output device 114 (e.g., another electronic device authorized by the user). In another embodiment, the output device 114 is coupled to or in communication with a device including actuators and capable of operating mechanical movements.

In an embodiment in which the method/system 400 is implemented in a vehicle as shown, for example, FIGS. 2A and 2B, a pre-programmed algorithm may be stored in the database 112 with respect to an output timing (e.g., when to generate an output speech and/or when to display an output image/video), a form (e.g., generating an output speech versus displaying an output video), and an information content of the outputted first and/or second output data. For example, the timing and information content of the actively and automatically generated output speeches or displayed output images/videos may be based on a determined expected level of driving attention desirable for driving the vehicle under the current circumstances. The determined expected level of driving attention may depend upon a current operation of the vehicle. For example, when the processor 102 determines that the vehicle is in motion, the processor 102 determines that the current expected level of driving attention has increased or is high. For example, the processor 102 may direct the communications unit 104 to generate an output speech when appropriate under the circumstances based on the detected data. On the contrary, when the processor 102 determines that the vehicle is not in motion and/or an engine of the vehicle is not operating, the processor 102 determines that the current expected level of driving attention has decreased. For example, under such circumstances, the processor 102 may direct the communications unit 104 to display a video in addition to or in lieu of generating the output speech.

Figure 5:
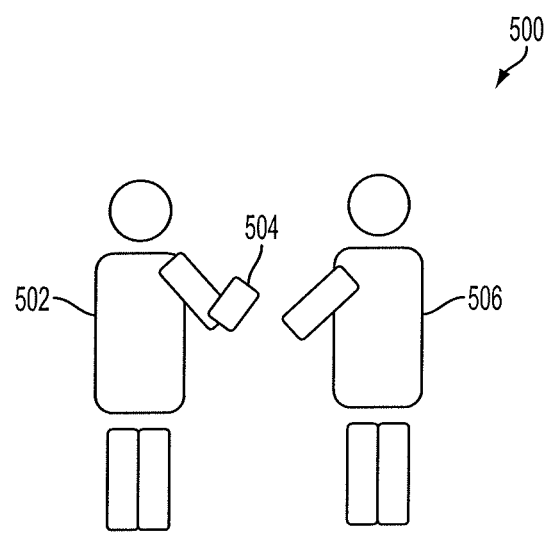
FIG. 5 illustrates a computer-based method/system of actively and automatically providing personal assistance to a user using a portable electronic device according to an embodiment of the present invention.

Referring to FIG. 5, the method/system 500, the portable electronic device 504 can utilize the sensors 106 (e.g., the microphone) to detect the data regarding the conversation between the user 502 and the person 506. The processor 102 can parse the conversation and store relevant elements in the database 112. An image or video of the person 506 may be captured using a camera and analyzed by the processor 102 as described above with respect to steps 402-422 of FIG. 4. A first and/or second output data may be outputted using the process described above with respect to the method/system 400.

Figure 6A:
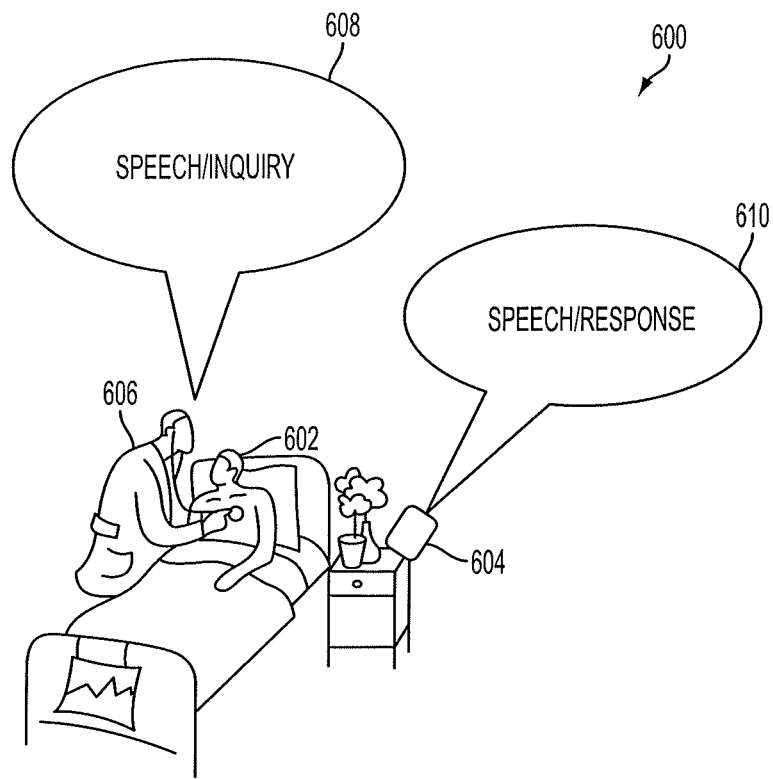
FIGS. 6A and 6B illustrate a computer-based method/system for providing personal assistance regarding health concerns to a user using a portable electronic device according to an embodiment of the present invention.
Figure 6B:
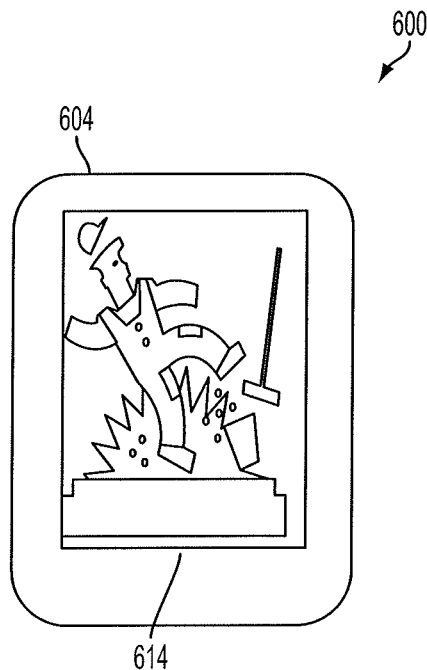

Referring to FIG. 6A, in the method/system 600, a portable electronic device 604 may provide personal assistance to the user 602 when visiting a health professional 606 for consultation, diagnosis, or treatment. A close-up view of the portable electronic device 604 is shown in FIG. 6B in order to facilitate illustration of the display of the communications unit 104 for the portable electronic device 604 of FIG. 6A.

As with other social encounters described herein, for example, if the portable electronic device 604 determines that the user 602 may not recall certain information with respect to the health professional 606, the visitation, or other associated information, the portable electronic device 604 may output a second output data for informing the user 602 accordingly (if appropriate under the circumstances). For example, the portable electronic device 604 may output a second output data reminding the user 602 of the number of years that the user 602 and the health professional 606 have known each other and their previous encounters, if the portable electronic device 604 determines that outputting such information would be appropriate under the circumstances.

An important aspect of the method/system 600 is that the first and/or second output data may be based on privacy concerns of the user 602 (e.g., concerns of the user 602 regarding with whom, to what extent, and in what manner the user 602 would be comfortable in sharing such information under the current circumstances). Privacy concerns may be programmed in the form of a pre-programmed algorithm stored in the database 112 which may further be supplemented during operations of the method/system 600 based on the detected, processed, and stored data. Such privacy concerns may be based on combinations of previously detected and processed data or the pre-programmed algorithm for determining what type of information is appropriate to be outputted under the circumstances. In one embodiment, individuals may be distinguished in part by social interaction classes. For example, privacy concerns are less weighty when a conversation is with the health professional 606, a family member or a therapist as discussed above. As such, some of the standards as to the extent of interaction with a trusted individual can be stored in pre-programmed data or algorithm, and some of the information regarding with whom and to what extent the method/system 600 should interact can be adjusted based on the detected data.

In one embodiment, the method/system 600 may associate a high level of trust with a person based on prior detected conversations of the user 602 with the person. That is, a detected friend having close/intimate relations with the user 602 can be distinguished from an acquaintance or a stranger based on prior conversations and interactions. Based in part on the recognized distinction, the portable electronic device 604 may adjust the degree and type of information included in the second output data. For example, if the processor 102 determines that because the user 602 would be comfortable with sharing certain information with the health professional 606 (acting in a professional capacity with expectations of upholding the privacy of the user 602), the portable electronic device 604 would output a higher degree of or more private information than the portable electronic device 604 would if the interactions were directed to an individual encountered for the first time and not acting in a confidential and professional capacity. The method/system 600 can determine whether the detected person is a health professional 606, therapist, or other professionals endowed with high level of trust and expectation of upholding privacy of communications based on the detected data, pre-programmed algorithm, and previously stored and processed data as discussed above with respect to FIG. 4.

In one embodiment as shown in FIG. 6, for example, the health professional 606 may inquire about the reason, the timing, or the cause of an arm injury sustained by the user 602 which has prompted visiting the health professional 606 by posing the speech/inquiry 608 to the user 602. The speech/inquiry 608 may be "How and when did your arm get injured?" directed to the user 602. The portable electronic device 604 may parse and analyze the conversation as described above in order to analyze the elements of the speech/inquiry 608 and the relationship, sequence, or correlation of the elements to one another based on previously detected, processed, and stored data. The portable electronic device 604 may search the database 112 regarding previous injuries sustained. The portable electronic device 604 may match the elements of "arm" and "injury" with a slip and fall accident leading to an arm injury which was sustained during a prior week and catalogued accordingly. After analyzing the elements of the speech/inquiry 608, the portable electronic device 604 may determine that the health professional 606 is interested in learning about the injury and that disclosing such information via the second output data would be appropriate in the current circumstances. The portable electronic device 604 may actively and automatically output a second output data informing the health professional 606 and the user 602 regarding the injury. For example, the portable electronic device 604 may generate an output speech/response 610 indicating that "[name of user 602] slipped last week landing on his arm. Here is how it happened." The output speech/response 610 may further include details regarding the recorded event (i.e. accident) in order to output a second output data for providing proactive assistance for an improved diagnosis and/or for providing a reminder of when and how the injury occurred.

The portable electronic device 604 may output a first output data and/or a second output data via the output device 114 or various other devices or methods without limiting the scope of the present invention. For example, the portable electronic device 604 may output a second output data using the communications unit 104.

In one embodiment, the portable electronic device 604 may be equipped with a display screen of displaying an output image/video 614 as determined by the processor 102. For example, the portable electronic device 604 may have previously recorded the slip and fall accident leading to the arm injury when the accident occurred. If so, the portable electronic device 604 may output the second output data by displaying the output image/video 614 in order to provide assistance for the diagnosis, treatment, or consultation. In other embodiments, the second output data may be communicated to another device of the user 602 or the health professional 606 (e.g., another portable electronic device).

The source of the detected data may not necessarily be the sensors 106. That is, multiple storage units and electronic devices may operate in concert sharing information in order to improve the quality and increase the quantity of information on which the outputted data are based. For example, the portable electronic device 604 may have access to the Internet or be in communication with the cloud-based database and computing 110 to receive input data previously or currently stored by an external device (e.g., a laptop computer) of the user 602. For example, if the user 602 has previously stored data in any of the electronic devices in communication with the cloud-based database and computing 110, the portable electronic device 604 may search such previously stored data for relevant information regarding the arm injury and output a second output data as described above accordingly.

Figure 7:
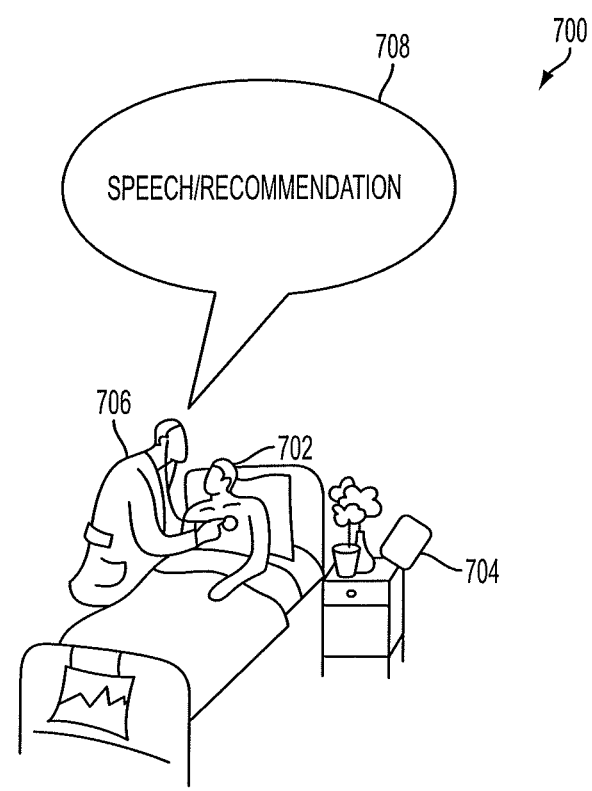
FIG. 7 illustrates a computer-based method/system for actively and automatically analyzing and storing detected data according to an embodiment of the present invention.

Referring to FIG. 7, in one embodiment of the method/system 700, the portable electronic device 704 may be the portable electronic device 604 discussed above with respect to FIG. 6. For example, the health professional 706 intends to provide recommendations as to courses of action that would improve a health condition of the user 702. For example, the health professional 706 may utter the speech/recommendation 708, stating that "I see how you got injured. Please maintain a nutritious diet including protein and vegetables, and perform weekly exercise/physical therapy routines of A, B, and C using 10 pound free weights." The processor 102 of the portable electronic device 704 analyzes the elements of the speech/recommendation 708. The method/system 700 stores and catalogues the information relating to exercise/physical therapy routines of A, B, and C using 10 pound free weights and the portable electronic device 704 and recognizes that the exercise/physical therapy routines of A, B, and C have to be performed once a week as instructed. The method/system 700 may automatically schedule reminders in the database 112 to be outputted on a weekly basis. The method/system 700 further stores and catalogues the analyzed data (e.g., regarding the recommended dietary regimens) in the database 112.

Figure 8:
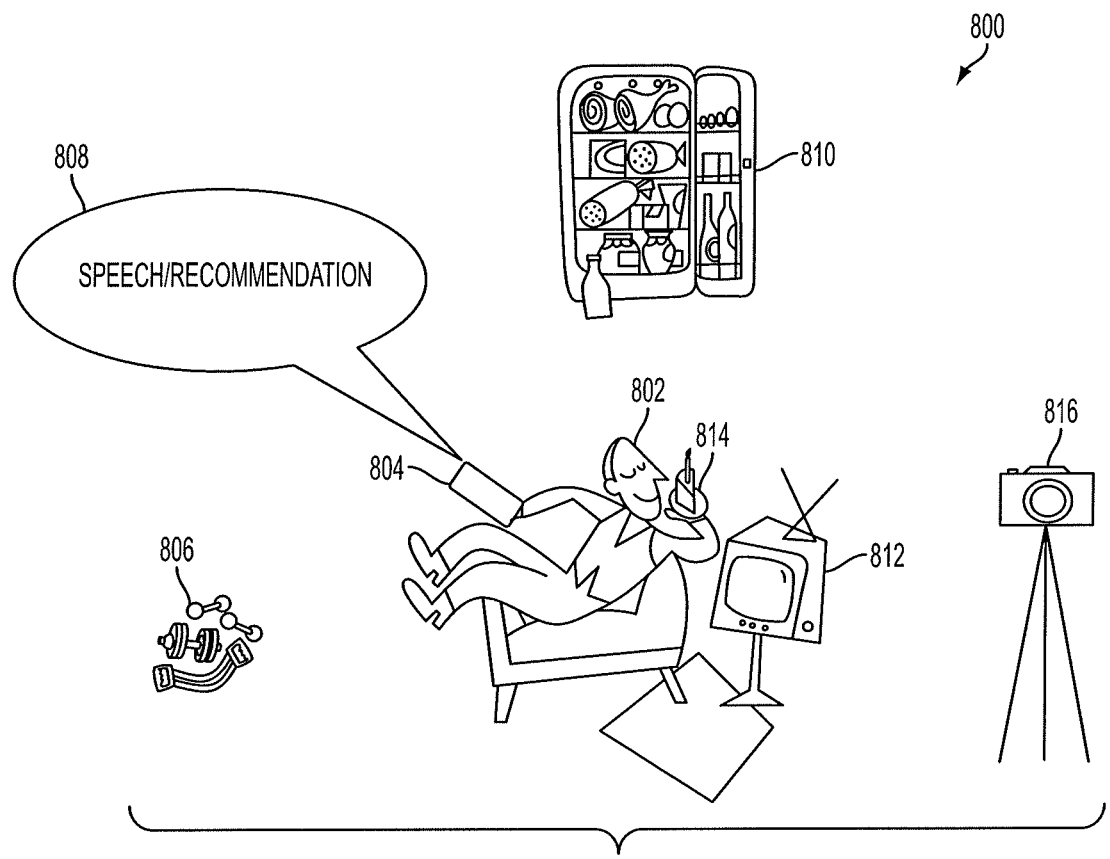
FIG. 8 illustrates a computer-based method/system implemented in a portable electronic device of actively and automatically outputting a second output data for providing personal assistance regarding health concerns to a user according to an embodiment of the present invention.

Referring to FIG. 8, in one embodiment of the method/system 800, the portable electronic device 804 may be the portable electronic device 704 discussed above with respect to FIG. 7. The portable electronic device 804 may recommend, motivate, or remind the user 802 of the information collected as discussed above with respect to FIGS. 6 and 7. For example, the method/system 800 may analyze the detected data in order to determine whether the user 802 is complying with the dietary and physical therapy guidelines set forth in the speech/recommendation 708.

For example, based on the analyzed first output data, the method/system 800 may determine that the user 802 has only performed physical exercise routine A during the past week. The method/system 800 may further determine that the user 802 is watching the TV 812 and eating a certain type of food 814 (e.g., a cheesecake) using various object recognition detection and processing methods and systems. The method/system 800 may further recognize that the user 802 is currently resting on the couch, and has not performed a substantial degree of physical activities during the past week.

The method/system 800 may search the Internet, the cloud-based database and computing 110, the memory 108, or other data to determine the nutritional value of the food 814. For example, the method/system 800 may generate the output speech 808 in order to encourage the user 802 to undertake a healthier food choice in order to facilitate a faster recovery based on the recommendations of the health professional 706. The method/system 800 may further seek to motivate the user 802 to perform the physical therapy routines of B and C. The output speech 808 may be "A week has passed since you last performed physical therapy routines B and C. You can use the light weights in the room per health professional's instructions. There are vegetables and eggs in the fridge to help maintain a nutritious diet." In another embodiment, the portable electronic device 804 may further remind the user 802 of taking medication properly if the health professional 706 had prescribed medication and provided instructions for taking the medication.

In other embodiments, the method/system 800 may be coupled to or in communication with a pedometer or other systems providing health information in order to have access to additional information regarding the health of the user 802. Alternatively, the method/system 800 may determine health factors based on the detected data corresponding to exercise activities, dietary habits, and other matters with or without an external health monitoring device.

Figure 9:
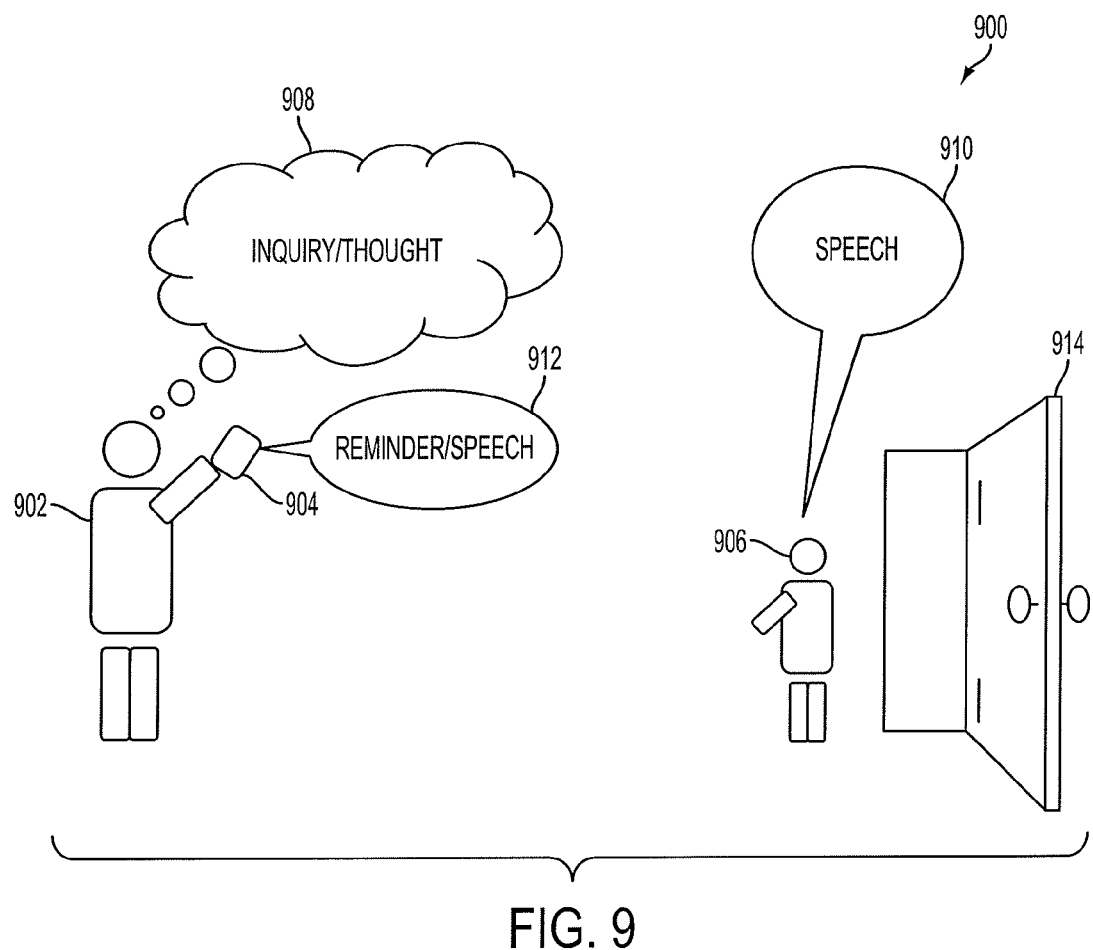
FIG. 9 illustrates a computer-based method/system of actively and automatically providing personal assistance to a user with memory retention/retrieval difficulties using a portable electronic device according to an embodiment of the present invention.

Referring to FIG. 9, in method/system 900, the user 902 may suffer from Alzheimer's complications or dementia, or alternatively, the user 902 may have certain difficulties with retaining, retrieving, or analyzing information using human brain/memory. The method/system 900 may recognize that the user 902 is suffering from such complications based on the pre-programmed algorithm and/or detected data. In one embodiment, the method/system 900 may implicitly provide information that is appropriate under the circumstances in order to jog the memory of the user 902. For example, a portable electronic device 904 may be continuously analyzing detected data within the proximity of the user 902 in order to determine if a new object, person, living being, or the other matter has entered the environment.

For example, as shown in FIG. 9, the portable electronic device 904 may recognize, using the detected data via the sensors 106, that a person has entered the environment by opening the door 914. The user 902 may utter the inquiry/thought 908 of "Who is that? He looks familiar." If the user 902 does not utter the inquiry/thought 908, the method/system 900 may recognize that the user 902 has not identified the newly entered person 906. For example, the processor 102 of the portable electronic device 904 may utilize a camera to operate face recognition of at least a facial feature of the user 902 to determine that the user 902 is perplexed while attempting to identify the newly entered person 906. In another embodiment, the method/system 900 may automatically output the second output data to jog the memory of the user 902 in a subtle manner as described below. Such an embodiment may be set as a default mode of operation if the portable electronic device is aware that the user 902 may have difficulties in retaining or retrieving information from memory.

For example, the processor 102 of the portable electronic device 904 may utilize a camera to operate face recognition of at least a facial feature of the newly entered person 906. The method/system 900 may recognize that the newly entered person 906 is Michael, the nephew of the user 902. In another embodiment, the recognition of the identity of the user 902 may be through speech recognition and the source of the speech (e.g., using a 3-D microphone). For example, if the newly entered person 906 utters a speech 910, the processor 102 may determine the identity of the newly entered person 906 and look up prior relevant data regarding the newly entered person 906 using the method/system 400. Other characteristics, interactions, physical appearance, or the like may be analyzed in order to determine the identity of the newly entered person 906.

The processor 102 may take into account the reliability of a particular piece of information detected by one of the sensors 106. For example, for identification or recognition of the newly entered person 906, the processor 102 may assign various probabilities of accurate detection or recognition. For example, the assigned probabilities of accurate detection or recognition may be based on the mechanism used to detect the newly entered person 906. In one embodiment, recognition or identification of the newly entered person 906 based on an identity code programmed in an identity device (e.g., a cellular phone) of the newly entered person 906 may not be as reliable as recognition based on a facial feature of the newly entered person 906 using a camera or speech recognition using a microphone, given that the newly entered 906 could be carrying an identity device of another individual.

The assigned probabilities of accurate identification or recognition may be further based on the circumstances under which the data is detected. For example, if a camera is obstructed causing the face of the newly entered person 906 to be unrecognizable, the method/system 900 may assign a relatively low probability of accurate detection or recognition in identifying the newly entered person 906. If the obstruction is removed and a facial recognition processing mechanism confirms the identity of the newly entered person 906, a higher probability of confidence would be associated with the identification or recognition. As such, the processor 102 may identify or recognize the newly entered person 906 based on a combination of various instances of data detection and further based on the corresponding probabilities of accurate recognition or identification.

Referring to FIG. 9, when the method/system 900 determines that the newly entered person 906 is "Michael," a nephew of the user 902, the portable electronic device 904 outputs appropriate information to provide indirect, subtle, and implicit reminders to the user 902. For example, if the method/system 900 recognizes that the newly entered person 906 is a close relative, the processor 102 of the portable electronic device 904 may determine that outputting information regarding the last time that the newly entered person 906 and the user 902 have met would not be appropriate in the current circumstances. Instead, the method/system 900 may provide information in a subtle fashion to remind the user 902 that the newly entered person 906 is the nephew of the user 902. For example, the portable electronic device 904 may direct the output reminder/speech 912 to the newly entered person, stating that "Hello Michael, your uncle [name of the user 902] will be with you shortly," thereby indirectly providing a reminder to the user 902 in a subtle fashion as appropriate under the circumstances.

Alternatively or in addition, the user 902 may request the portable electronic device 904 to generate additional information. The portable electronic device 904 may passively output, using the communications unit 104, a first output data upon the request from the user 902.

Figure 10:
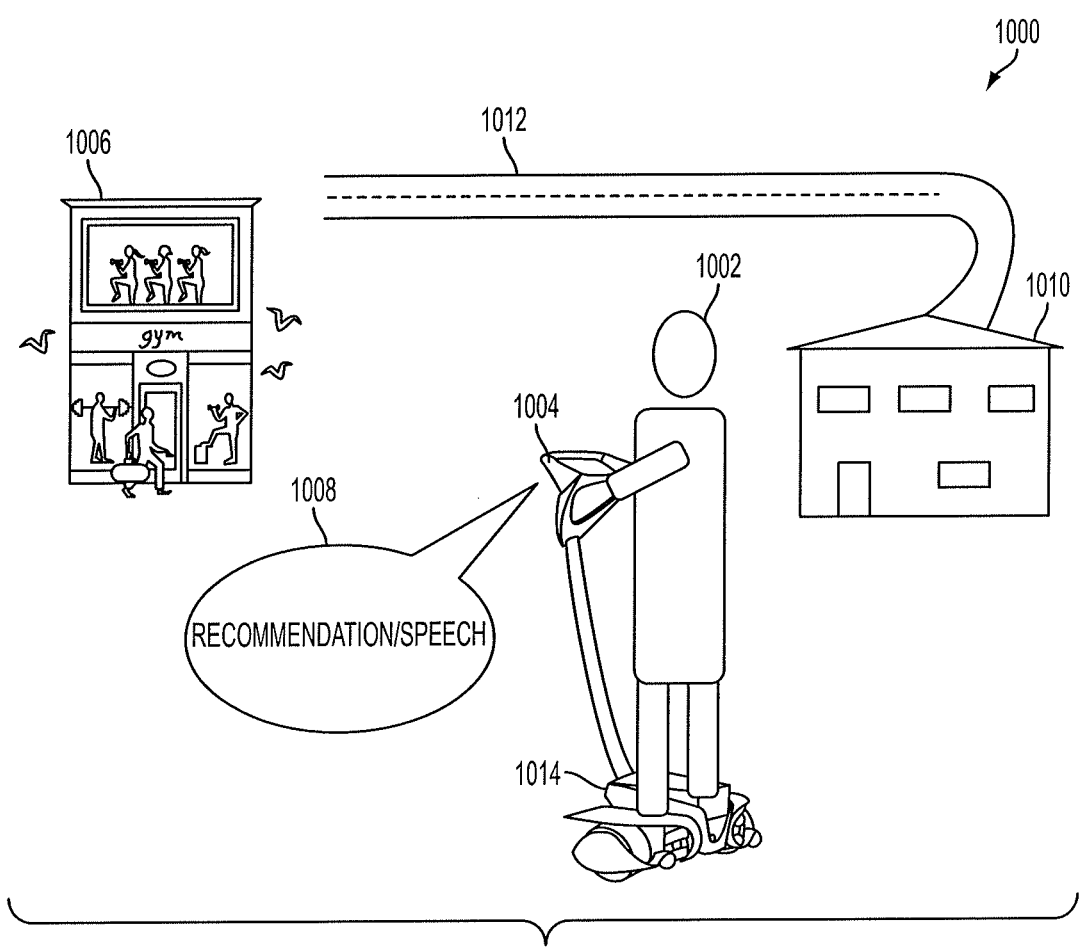
FIG. 10 illustrates a computer-based method/system of providing personal assistance using a two-wheeled balancing device according to an embodiment of the present invention.

Referring to the method/system 1000 of FIG. 10, in one embodiment, the vehicle 1004 may be a two-wheeled self-balancing device. The user 1002 may shift his/her weight in order to direct the vehicle 1004 to maneuver towards a desired direction. The handle bar of the vehicle 1004 may be included solely for providing additional comfort for the user 1002 given that the detected weight shift of the user 1002 using the base portion 1014 of the vehicle 1004 may contain sufficient maneuvering directions from the user 1002.

In one embodiment, the vehicle 1004 may communicate directly with the user 1002. For example, the vehicle 1004 may have speech recognition and generation capabilities as discussed above. For example, a camera may be implemented on the vehicle 1004 to capture first and/or data regarding the surrounding environment of the user 1002. In another embodiment, the user 1002 may communicate with a portable electronic device of the user 1002 (e.g., the portable electronic device 304, 504, 604, 704, 804, or 904 discussed above with respect to FIG. 3, 5, 6, 7, 8, or 9, respectively) in communication with or coupled to a communication port of the vehicle 1004. For example, a software application may be installed on a smart phone of the user 1002 in order to communicate data with the vehicle 1004.

As shown in FIG. 10, the method/system 1000 has determined, based on the detected, processed, and stored data that the user 1002 seeks to perform physical activities and exercises in order to maintain a healthier lifestyle. The method/system 1000 may include or be in communication with a GPS device. The method/system 1000 may recognize that a building is located on the right hand side of the user 1002. The method/system 1000 may automatically obtain data regarding the building and determine that the building is a gymnasium 1006. The data may be obtained from the combination of data received from the GPS device and previously detected, processed, and stored data. The method/system 1000 may further determine the location of the home 1010 of the user 1002 and the distance and directions from the home 1010 of the user 1002 to the gymnasium 1006. The method/system 1000 may automatically output a second output data recommending that the user 1002 consider signing up at the gymnasium 1006.

The method/system 1000 may determine that based on the driving directions obtained from the GPS device, the route will take 20 minutes by travelling via the vehicle 1004 and will take 4 minutes by travelling via an automobile on the road 1012. In order to facilitate the decision making process, the method/system 1000 may provide further information, for example, by generating the following output recommendation/speech 1008:

"Since you mentioned that you seek to work out to lose weight, I have noticed that a gym has opened on your right recently. If you use this device, it will take you 20 minutes and if you drive westbound using road 1012, it will take you 4 minutes to get there. It may be a good idea to exercise in the morning before work."

Figure 11:
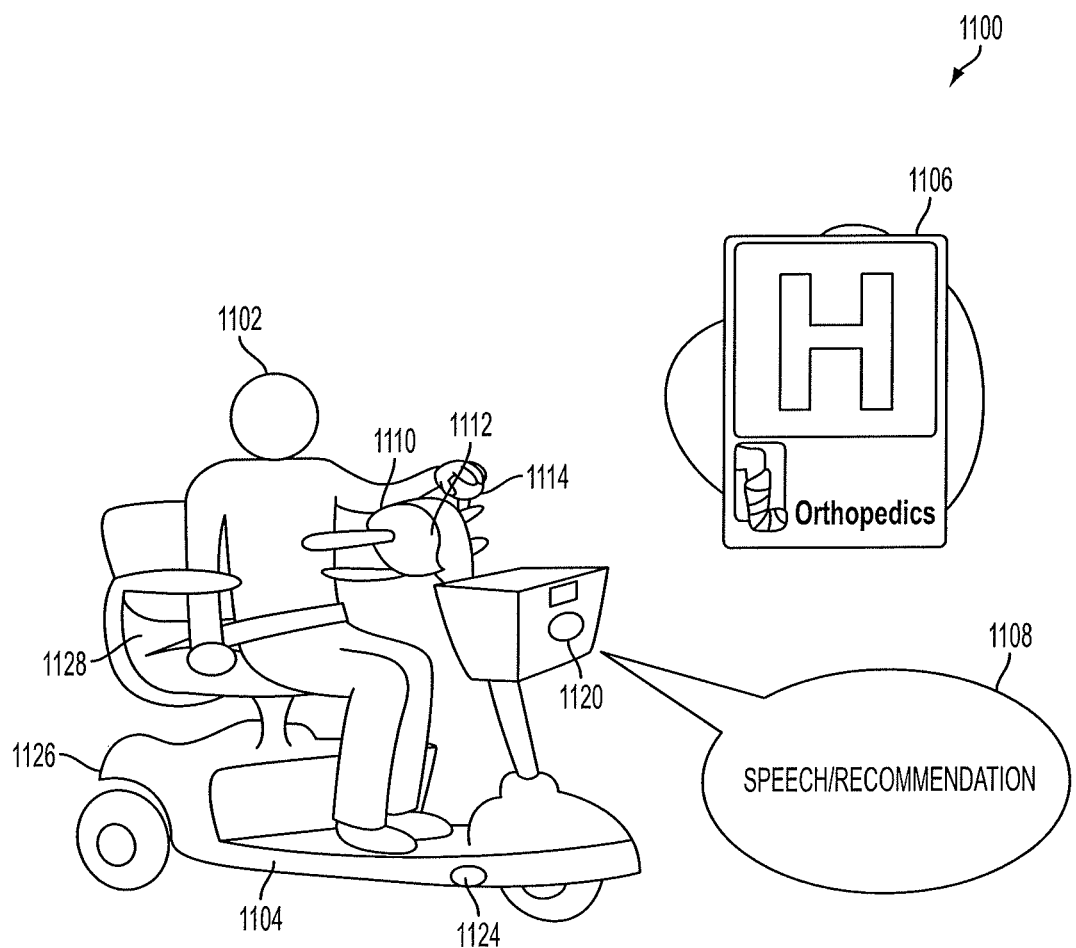
FIG. 11 illustrates a computer-based method/system of providing personal assistance using a wheelchair or a three-wheeled transportation device according to an embodiment of the present invention.

Referring to the method/system 1100 of FIG. 11, a vehicle 1104 may be a wheelchair or a three-wheeled transportation device. Any of the sensors 106 described above may be implemented on the vehicle 1104. For example, the sensors 106 may be installed in sensor locations 1110, 1120, 1124, and 1126. The sensors 106 may be positioned at any other portion of the vehicle 1104 without limiting the scope of the invention. For example, a camera may be positioned at the sensor location 1120 in order to collect data regarding the surrounding environment. A camera, microphone, or other sensors 106 described above may also be installed at sensor location 1110. Perimeter monitoring sensors and laser scanning sensors may be installed as sensor locations 1124 and 1126. IMU's, gyroscopes, GPS system, and the like may further be mounted on the vehicle 1104. The vehicle 1104 may further include a user interface 1112 to communicate with the user 1102.

The output device 114 of vehicle 1104 may be a mechanical device having actuators capable of maneuvering the vehicle 1104 based on a third output data outputted by the processor 102. For example, the vehicle 1104 may include a joystick 1114 that allows the user 1102 to maneuver the vehicle 1104 towards a desired direction. Alternatively or in addition, tactile data of the user 1102 may be detected.

For example, in the case of an Alzheimer's patient or a user 1102 with short term memory difficulties, if the user 1102 forgets a particular destination, the method/system 1100 may guide the wheelchair and the user 1102 to the destination. If the user 1102 is controlling the method/system 1100, e.g., using the joystick 1114 as described above, a response such as a vibration may be outputted to alarm the user 1102 that the user 1102 is heading the wrong way or to further guide the user 1102 towards the desired destination. Vibration motors can further provide feedback to the user 1102. Such vibration motors can be integrated in or coupled to an article of manufacture carried or worn by the user 1102. For example, a belt 1128 or a vest may be coupled to the vehicle 1104 by which a vibration may provide information to the user 1102.

Using the sensors 106, the method/system 1100 may recognize that an orthopedic clinic 1106 is located on the left of the vehicle 1104 and user 1102. Using the process described in details above (e.g., with respect to the method/system 400 of FIG. 4), the method/system 1100 may match the detected data regarding the observed orthopedic clinic 1106 with a previously stored event (e.g., an arm injury discussed with respect to FIG. 6). Using the method/system 400 described above with respect to FIG. 4, the method/system 1100 may output a second output data for providing a reminder data and recommending that the user 1102 visits the orthopedic clinic 1106 in order to receive treatment before the injury exacerbates. For example, the method/system 1100 may generate an output speech 1108 as follows: "You can visit the Orthopedic Clinic on your left for the arm injury you sustained last week."

Referring to FIGS. 1-11, one important aspect of the invention is that information can be shared between all or various combinations of the devices set forth above in FIGS. 1-12. For example, the portable electronic device 304, 504, 604, 704, 804, or 904 discussed above with respect to FIG. 3, 5, 6, 7, 8, or 9, respectively, along with the vehicles discussed above with respect to FIGS. 2A, 2B, 10, and 11, and the external devices such as communication devices, cell phones, laptops, cameras, or other devices capable of communicating with or being coupled to the listed devices or units can share information, using the cloud-based database and computing 110 or the Internet, in order to access, store, and process the pool of the detected, processed, and stored data.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., android, iPhone®, Palm Pilot®, Blackberry®), cellular phone, kiosk, and the like), online communications, satellite communications, off-line communications, wireless communications, transponder communications, local area network (LAN), wide area network (WAN), virtual private network (VPN), networked or linked devices, keyboard, mouse and/or any suitable communication or data input modality. Specific information related to the protocols, standards, and application software utilized in connection with the Internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

Systems, methods and computer program products are provided. References to "various embodiments", in "some embodiments", "one embodiment", "an embodiment", "an example embodiment", and the like, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The steps of a method or algorithm described in connection with the examples disclosed herein may be embodied directly in hardware, in a software module executed by the processor 102, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor 102 such that the processor 102 can read information from, and write information to, the storage medium. In the alternative, the storage medium may be integral to the processor 102. The processor 102 and the storage medium may reside in an Application Specific Integrated Circuit (ASIC).

The methods/systems 100-1100 may be described herein in terms of functional block components, screen shots, optional selections and various processing steps. It should be appreciated that such functional blocks may be realized by any number of hardware and/or software components configured to perform the specified functions. For example, the methods/systems 100-1100 may employ various integrated circuit components, e.g., memory elements, processing elements, logic elements, look-up tables, and the like, which may carry out a variety of functions under the control of one or more microprocessors or other control devices. Similarly, the software elements of the methods/systems 100-1100 may be implemented with any programming or scripting language such as, VPL, C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the methods/systems 100-1100 may employ any number of conventional techniques for data transmission, signaling, data processing, network control, and the like.

As will be appreciated by one of ordinary skill in the art, the methods/systems 100-1100 may be embodied as a customization of an existing system, an add-on product, upgraded software, a stand-alone system, a distributed system, a method, a data processing system, a device for data processing, and/or a computer program product. Furthermore, the methods/systems 100-1100 may take the form of a computer program product on a non-transitory computer-readable storage medium having computer-readable program code means embodied in the storage medium. Any suitable computer-readable storage medium may be utilized, including hard disks, CD-ROM, optical storage devices, magnetic storage devices, and/or the like.

Exemplary embodiments of the methods/systems 100-1100 have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A computer-based method comprising the steps of:
   detecting, using at least one sensor, a data associated with at least one person, an object, a living being, a place, an environment, or combinations thereof within a proximity of at least one of the at least one sensor;
   selectively storing, using a processor, a learned data in a database based on the detected data and a pre-programmed algorithm stored in the database;
   passively outputting, using a communications unit or an output device coupled to or in communication with the processor, a first output data upon a request received by the processor or a predetermined or scheduled event stored in the database; and
   actively and automatically outputting, using the communications unit or the output device, a second output data based on the detected data, the learned data, and the pre-programmed algorithm,
   wherein the step of actively and automatically outputting, using the communications unit or the output device, the second output data includes at least one of:
   displaying, using a display, an output image or an output video, the display being coupled to or in communication with the communications unit or the output device, or
   generating, using a speaker, an output speech, the speaker being coupled to or in communication with the communications unit or the output device.

2. The method of claim 1, wherein the detected data corresponds to at least one of:
   a visual characteristic, a speech, tactile information, a motion, an interaction, an action, a behavior, a conversation, a location, an identity, an attribute, or combinations thereof associated with the at least one person,
   a motion, a sound, an interaction, an action, tactile information, a visual characteristic, a location, an identity, or combinations thereof associated with the object, the living being, the place, the environment, or combinations thereof within a proximity of at least one of the at least one sensor, or
   a visual characteristic, a type, a location, a temperature, a moisture content, a weather condition, a sound, an attribute, or combinations thereof associated with the place or the environment within a proximity of at least one of the at least one sensor.

3. The method of claim 1, further comprising:
   analyzing, using the processor, the detected data based on the learned data corresponding to the at least one person, the object, the living being, the event, the place, the environment, or combinations thereof, wherein the steps of selectively storing the database and actively and automatically outputting the second output data are further based on the analyzed data.

4. The method of claim 1, wherein the method is implemented in a vehicle.

5. The method of claim 1, wherein the method is implemented in a portable electronic device.

6. The method of claim 1, further comprising:
analyzing, using the processor, a conversation or an interaction based on the detected data,
wherein the step of actively and automatically outputting the second output data further includes at least one of:
actively and automatically generating, using the communications unit or the output device, an output speech, an output image, an output video, or combinations thereof for actively and automatically initiating or participating in the conversation or the interaction with the at least one person, or
actively and automatically generating, using the communications unit or the output device, the output speech, the output image, the output video, or combinations thereof for actively communicating a reminder to a user.

7. The method of claim 1, further comprising:
determining, using the processor, a relationship, a sequence, or a correlation between at least two of the at the at least one person, the object, the living being, the event, the place, or the environment based on the learned data and the pre-programmed algorithm,
wherein the step of actively and automatically outputting the second output data is further based on the determined relationship, sequence, or correlation.

8. The method of claim 1, further comprising:
actively and automatically improving a quality of or increasing a quantity of the detected data by performing at least one of:
actively and automatically outputting, using the communications unit or the output device, the second output data in form of a question or an inquiry for eliciting a response or an input from the at least one person, or
actively and automatically outputting, using the communications unit or the output device, the second output data for participating in a conversation or an interaction with the at least one person.

9. The method of claim 1, wherein:
the at least one sensor is at least one of an image sensor, a vibration sensor, a microphone, a proximity detector, a position detector, a force sensor, a distance sensor, a laser scanner, or a radar sensor, and
the at least one sensor is integrated in or coupled to at least a vehicle or a portable electronic device.

10. The method of claim 1, wherein the database includes or is in communication with a cloud-based database, the processor being further configured to:
transmit, using the cloud-based database, the detected data, the first output data, the second output data, or combinations thereof to an external device coupled to or in communication with the cloud-based database, and
receive, using the cloud-based database, an input data from the external device.

11. The method of claim 1, wherein the at least one person includes a user with disabilities or suffering from health or memory complications, and wherein the step of actively and automatically outputting the second output data further includes:

associating the detected data with the learned data corresponding to the person, the object, the living being, the event, the place, the environment, or combinations thereof,
wherein the second output data corresponds to a reminder data directed to communicating information to the user with respect to identification, characteristics, location, actions, or interactions of the at least one person, the object, the living being, the event, the place, the environment, or combinations thereof.

12. The method of claim 1, wherein the method further comprises:
analyzing, using the processor, health, exercise, or diet activities of the at least one person based on the detected data,
wherein the step of actively and automatically outputting the second output data includes at least one of:
outputting, using the communications unit or the output device, the second output data to a health professional for assisting the health professional in evaluation of the health, exercise, or diet activities of the at least one person, or
outputting, using the communications unit or the output device, the second output data to the at least one person for outputting a recommendation associated with the health, exercise, or diet activities.

13. The method of claim 1, wherein the pre-programmed algorithm corresponds to appropriateness algorithm rules for determining: information content of the second output data, privacy concerns of a user, context of a detected event, or combinations thereof, the method further comprising:
analyzing, using the processor, the detected data based on the appropriateness algorithm rules and the learned data,
wherein the step of actively and automatically outputting the second output data is based on the analyzed data.

14. A vehicle comprising:
at least one sensor configured to detect a data associated with a driver, a passenger, an object, a living being, an event, a place, an environment, or combinations thereof within a proximity of at least one of the at least one sensor;
a database storing a pre-programmed algorithm including a speech recognition and processing algorithm;
a communications unit including a display, a microphone, and a speaker; and
a processor coupled to or in communication with the at least one sensor, the database, and the communications unit, the processor being configured to:
selectively store a learned data in the database based on the detected data and the pre-programmed algorithm,
analyze the detected data based on the learned data and the pre-programmed algorithm,
detect, using the speech recognition and processing algorithm, a speech of at least one of the driver or the passenger,
analyze, using the speech recognition and processing algorithm, the detected speech based on the learned data,
determine a relationship, a sequence, or a correlation between the detected speech and the driver, the passenger, the object, the living being, the event, the place, the environment, or combinations thereof,
passively output, using the communications unit, a first output data upon a request received by the processor or a predetermined or scheduled event stored in the database, and actively and automatically output, using the communications unit, a second output data based on the analyzed data, the learned data, and the pre-programmed algorithm, by performing at least one of:

generating, using the speaker, an output speech based on the determined relationship, sequence, or correlation, or displaying, using the display, an output image or an output video based on the determined relationship, sequence, or correlation.

15. The vehicle of Claim 14, wherein the processor is further configured to:

determine a current expected level of driving attention based on the detected data and based on a current operation of the vehicle, and determine an output timing and an information content of the generated output speech or the displayed output image or output video based on the determined current expected level of driving attention.

16. The vehicle of claim 15, wherein the database includes or is in communication with a cloud-based database, the processor being further configured to:

transmit, using the cloud-based database, the detected data, the first output data, the second output data, or combinations thereof to an external device, and receive, using the cloud-based database, an input data from the external device.

17. A portable electronic device comprising:

at least one sensor configured to detect a data associated with at least one person or a user, an object, a living being, an event, a place, an environment, or combinations thereof within a proximity of at least one of the at least one sensor;

a database storing a pre-programmed algorithm including a speech recognition and processing algorithm;

a communications unit including a display, a microphone, and a speaker; and a processor coupled to or in communication with the at least one sensor, the database, and the communications unit, the processor being configured to:

selectively store a learned data in the database based on the detected data and the pre-programmed algorithm, analyze the detected data based on the learned data and the pre-programmed algorithm, detect, using the speech recognition and processing algorithm, a speech of the at least one person or the user, analyze, using the speech recognition and processing algorithm, the detected speech based on the learned data, determine a relationship, a sequence, or a correlation between the detected speech and the at least one person, the user, the object, the living being, the event, the place, the environment, or combinations thereof, passively output, using the communications unit, a first output data upon a request received by the processor or a predetermined or scheduled event stored in the database, and actively and automatically output, using the communications unit, a second output data based on the analyzed data, the learned data, and the pre-programmed algorithm by performing at least one of:

generating, using the speaker, an output speech based on the determined relationship, sequence, or correlation, or displaying, using the display, an output image or an output video based on the determined relationship, sequence, or correlation.

18. A computer-based method comprising the steps of:

detecting, using at least one sensor, a data associated with at least one person, a user, an object, a living being, a place, an environment, or combinations thereof within a proximity of at least one of the at least one sensor;

selectively storing, using a processor, a learned data in a database based on the detected data and a pre-programmed algorithm stored in the database;

analyzing, using the processor, a conversation or an interaction based on the detected data;

passively outputting, using a communications unit or an output device coupled to or in communication with the processor, a first output data upon a request received by the processor or a predetermined or scheduled event stored in the database; and actively and automatically outputting, using the communications unit or the output device, a second output data based on the detected data, the learned data, and the pre-programmed algorithm, wherein the step of actively and automatically outputting the second output data further includes at least one of:

actively and automatically generating, using the communications unit or the output device, an output speech, an output image, an output video, or combinations thereof for actively and automatically initiating or participating in the conversation or the interaction with the at least one person or the user, or actively and automatically generating, using the communications unit or the output device, the output speech, the output image, the output video, or combinations thereof for actively communicating a reminder to the user.

19. The computer-based method of claim 18, wherein the detected data corresponds to at least one of:

a visual characteristic, a speech, tactile information, a motion, an interaction, an action, a behavior, a conversation, a location, an identity, an attribute, or combinations thereof associated with the at least one person, a motion, a sound, an interaction, an action, tactile information, a visual characteristic, a location, an identity, or combinations thereof associated with the object, the living being, the place, the environment, or combinations thereof within a proximity of at least one of the at least one sensor, or a visual characteristic, a type, a location, a temperature, a moisture content, a weather condition, a sound, an attribute, or combinations thereof associated with the place or the environment within a proximity of at least one of the at least one sensor.

20. The computer-based method of claim 18, wherein the method is implemented in a vehicle.

21. A computer-based method comprising the steps of:

detecting, using at least one sensor, a data associated with at least one person, an object, a living being, a place, an environment, or combinations thereof within a proximity of at least one of the at least one sensor;

selectively storing, using a processor, a learned data in a database based on the detected data and a pre-programmed algorithm stored in the database;

passively outputting, using a communications unit or an output device coupled to or in communication with the processor, a first output data upon a request received by the processor or a predetermined or scheduled event stored in the database;

actively and automatically outputting, using the communications unit or the output device, a second output data based on the detected data, the learned data, and the pre-programmed algorithm; and actively and automatically improving a quality of or increasing a quantity of the detected data by performing at least one of:

actively and automatically outputting, using the communications unit or the output device, the second output data in form of a question or an inquiry for eliciting a response or an input from the at least one person, or actively and automatically outputting, using the communications unit or the output device, the second output data for participating in a conversation or an interaction with the at least one person.

22. The computer-based method of claim 21, wherein the method is implemented in a vehicle.

23. The computer-based method of claim 21, wherein the at least one sensor is at least one of an image sensor, a vibration sensor, a microphone, a proximity detector, a position detector, a force sensor, a distance sensor, a laser scanner, or a radar sensor, and the at least one sensor is integrated in or coupled to at least a vehicle or a portable electronic device.

24. A computer-based method comprising the steps of:

detecting, using at least one sensor, a data associated with at least one person, an object, a living being, a place, an environment, or combinations thereof within a proximity of at least one of the at least one sensor;

selectively storing, using a processor, a learned data in a database based on the detected data and a pre-programmed algorithm stored in the database, the database including or being in communication with a cloud-based database;

passively outputting, using a communications unit or an output device coupled to or in communication with the processor, a first output data upon a request received by the processor or a predetermined or scheduled event stored in the database;

actively and automatically outputting, using the communications unit or the output device, a second output data based on the detected data, the learned data, and the pre-programmed algorithm;

transmitting, using the cloud-based database, the detected data, the first output data, the second output data, or combinations thereof to an external device coupled to or in communication with the cloud-based database; and receiving, using the cloud-based database, an input data from the external device.

25. The computer-based method of claim 24, wherein the detected data corresponds to at least one of:

a visual characteristic, a speech, tactile information, a motion, an interaction, an action, a behavior, a conversation, a location, an identity, an attribute, or combinations thereof associated with the at least one person, a motion, a sound, an interaction, an action, tactile information, a visual characteristic, a location, an identity, or combinations thereof associated with the object, the living being, the place, the environment, or combinations thereof within a proximity of at least one of the at least one sensor, or a visual characteristic, a type, a location, a temperature, a moisture content, a weather condition, a sound, an attribute, or combinations thereof associated with the place or the environment within a proximity of at least one of the at least one sensor.

26. The computer-based method of claim 24, wherein the step of actively and automatically outputting the second output data includes at least one of:

displaying, using a display coupled to or in communication with the communications unit or the output device, an output image or an output video, or generating, using a speaker coupled to or in communication with the communications unit or the output device, an output speech.

27. A computer-based method comprising the steps of:

detecting, using at least one sensor, a data associated with at least one person, an object, a living being, a place, an environment, or combinations thereof within a proximity of at least one of the at least one sensor;

selectively storing, using a processor, a learned data in a database based on the detected data and a pre-programmed algorithm stored in the database;

analyzing, using the processor, the detected data based on the appropriateness algorithm rules and the learned data;

passively outputting, using a communications unit or an output device coupled to or in communication with the processor, a first output data upon a request received by the processor or a predetermined or scheduled event stored in the database; and actively and automatically outputting, using the communications unit or the output device, a second output data based on the analyzed data, the detected data, the learned data, and the pre-programmed algorithm, wherein the pre-programmed algorithm corresponds to appropriateness algorithm rules for determining an information content of the second output data, a privacy concern of a user, a context of a detected event, or combinations thereof.

28. The computer-based method of claim 27, wherein the method is implemented in a vehicle.

29. The computer-based method of claim 27, wherein the step of actively and automatically outputting the second output data includes at least one of:

displaying, using a display coupled to or in communication with the communications unit or the output device, an output image or an output video, or generating, using a speaker coupled to or in communication with the communications unit or the output device, an output speech.

* * * * *